United States Patent
Yelle et al.

(10) Patent No.: US 12,359,423 B2
(45) Date of Patent: Jul. 15, 2025

(54) SELF-SEALING JOINT SEALING SYSTEM

(71) Applicant: LOUISIANA-PACIFIC CORPORATION, Nashville, TN (US)

(72) Inventors: Jeffrey Yelle, Hendersonville, TN (US); Jianwen Ni, Franklin, TN (US); Phillip J. Vacca, Jr., St. John, IN (US); Theodore Peters, Cullman, AL (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 15 days.

(21) Appl. No.: 17/479,969

(22) Filed: Sep. 20, 2021

(65) Prior Publication Data

US 2022/0090374 A1 Mar. 24, 2022

Related U.S. Application Data

(60) Provisional application No. 63/080,078, filed on Sep. 18, 2020.

(51) Int. Cl.

| | |
|---|---|
| *E04B 1/68* | (2006.01) |
| *B27N 3/10* | (2006.01) |
| *B27N 3/18* | (2006.01) |
| *B27N 7/00* | (2006.01) |
| *E04C 2/16* | (2006.01) |

(52) U.S. Cl.
CPC .............. *E04B 1/6812* (2013.01); *B27N 3/10* (2013.01); *B27N 3/18* (2013.01); *B27N 7/00* (2013.01); *E04C 2/16* (2013.01); *E04B 2103/04* (2013.01)

(58) Field of Classification Search
CPC .............. E04F 2201/07; E04F 15/0216; E04F 15/02011; E04F 13/076; E04F 13/0891; E04F 13/0894; E04F 13/0898; E04B 1/6812; E04B 1/6801; E04B 1/6804; E04B 1/6806; E04B 1/6807; E04B 1/6813; E04B 1/6815; E04B 2001/6818
See application file for complete search history.

(56) References Cited

U.S. PATENT DOCUMENTS

| | | | | |
|---|---|---|---|---|
| 2,578,085 | A | * | 12/1951 | Perkins ..................... E04B 2/56 52/464 |
| 3,077,703 | A | * | 2/1963 | Bergstrom .............. E04D 3/355 52/592.4 |
| 3,357,146 | A | * | 12/1967 | Gartrell ................... E04C 2/292 52/592.4 |

(Continued)

*Primary Examiner* — Kyle J. Walraed-Sullivan
(74) *Attorney, Agent, or Firm* — Wayne Edward Ramage; Baker Donelson

(57) ABSTRACT

An integrated self-sealing joint sealing system that is incorporated into the factory edges of a sheathing panel prior to installation at a job site, eliminating the need to secondarily apply tapes or similar fluid-applied sealants, as the joints will become sealed when mated and installed next to adjacent sheathing panels. The system works with a variety of joint types, including, but not limited to, bead-and-cove joints, cove-and-cove, and cove-and-butt joints, with matching corresponding joint profiles along panel edges. A compressible sealant, adhesive or gasket material is applied to surfaces in one or both profiles at the factory during the manufacturing process. During field installation, the matching corresponding joint profiles are placed together so the sealant material is compressed, forming a complete watertight and airtight joint.

8 Claims, 5 Drawing Sheets

(56) References Cited

U.S. PATENT DOCUMENTS

| | | | | |
|---|---|---|---|---|
| 4,099,355 | A * | 7/1978 | Strunk | E04B 1/80 52/404.3 |
| 4,817,963 | A * | 4/1989 | Munden | E04B 1/6801 277/944 |
| 5,502,939 | A * | 4/1996 | Zadok | E04B 1/6129 52/592.1 |
| 5,935,695 | A * | 8/1999 | Baerveldt | B32B 5/18 428/317.1 |
| 6,942,915 | B1 * | 9/2005 | Kondo | B29C 66/723 428/137 |
| 7,188,456 | B2 * | 3/2007 | Knauseder | E04F 15/02 52/592.1 |
| 11,479,335 | B2 * | 10/2022 | Koh | B64C 1/18 |
| 2002/0108342 | A1 * | 8/2002 | Henits | E04F 13/042 52/417 |
| 2003/0093964 | A1 * | 5/2003 | Bushey | E04F 15/02 52/459 |
| 2004/0066006 | A1 * | 4/2004 | Baerveldt | E04B 1/6812 277/590 |
| 2004/0137180 | A1 * | 7/2004 | Sjoberg | E04F 15/02016 428/192 |
| 2004/0200154 | A1 * | 10/2004 | Hunter, Jr. | E04D 3/38 52/90.2 |
| 2006/0053724 | A1 * | 3/2006 | Braun | C09J 5/00 52/578 |
| 2006/0070331 | A1 * | 4/2006 | Yakobics | E04F 13/042 52/581 |
| 2006/0272262 | A1 * | 12/2006 | Pomberger | E04F 13/08 52/589.1 |
| 2008/0014399 | A1 * | 1/2008 | Martin | B29C 66/1162 428/57 |
| 2008/0295438 | A1 * | 12/2008 | Knauseder | E04F 15/02 403/336 |
| 2009/0308001 | A1 * | 12/2009 | Wu | E04F 13/0885 52/173.3 |
| 2012/0023846 | A1 * | 2/2012 | Mattox | E04B 1/948 264/267 |
| 2013/0255174 | A1 * | 10/2013 | Stafford | E04F 15/02038 52/519 |
| 2013/0269279 | A1 * | 10/2013 | Fowler | E04F 15/10 52/588.1 |
| 2014/0109507 | A1 * | 4/2014 | Dossche | B32B 13/02 428/455 |
| 2016/0177576 | A1 * | 6/2016 | Ramachandra | E04F 15/02016 52/588.1 |
| 2018/0148922 | A1 * | 5/2018 | Robinson | E04B 1/948 |
| 2018/0179754 | A1 * | 6/2018 | Karnicki | B32B 21/042 |
| 2018/0209146 | A1 * | 7/2018 | Lewit | E04C 2/246 |
| 2019/0234079 | A1 * | 8/2019 | Edwall | E04F 15/02038 |
| 2024/0368879 | A1 * | 11/2024 | Nowacek | E04B 1/08 |

* cited by examiner

SELF-SEALING JOINT SEALING SYSTEM

This application claims benefit of and priority to U.S. Provisional App. No. 63/080,078, filed Sep. 18, 2020, which is incorporated herein in its entirety by specific reference for all purposes.

FIELD OF INVENTION

This invention relates to an integrated self-sealing joint sealing system for sheathing and structural panels.

SUMMARY OF INVENTION

In various exemplary embodiments, the present invention comprises an integrated self-sealing joint sealing system that is incorporated into the factory edges of a sheathing panel prior to installation at a job site. The integrated self-sealing joint sealing system eliminates the need to secondarily apply tapes or similar fluid-applied sealants, as the joints will become sealed when mated and installed next to adjacent sheathing panels. The system of the present invention may be used with panels that do not have an integrated WRB membrane or layer, as well as with panels that do have an integrated WRB membrane or layer.

The invention works with a variety of joint types, including, but not limited to, shiplap joints, tongue-and-groove joints, bead-and-cove joints, and butt joints. In several embodiments, as shown in the figures, the joint comprises a bead-and-cove or cove-and-cove type joint, with corresponding joint profiles machined on corresponding edges of adjacent panels, or a cove-and-butt type joint. This type of joint increases the surface area for sealants to form a watertight and airtight seam. As compared to a shiplap joint, the joint described herein reduces or eliminates the overlap areas of the joints, thereby enabling placement of fasteners (e.g., a nail, screw, staple, or the like) within or through full thickness panel edges, and thus more securely into framing members on which the panel is mounted. Placement of fasteners within two half-thickness portions of the panels (such as with a shiplap or similar overlapping joint), rather than a single full-thickness panel edge, will reduce in-plane shear strength (e.g., shear wall racking).

In several embodiments, all four edges of a panel have a corresponding joint profile. For example, two adjacent edges of a panel will have a bead profile, and the opposite edges will have a cove profile, although other configurations are possible. A compressible sealant, adhesive or gasket material is applied to surfaces in one or both profiles at the factory during the manufacturing process. During field installation, the matching corresponding joint profiles are placed together so the sealant material is compressed, forming a complete joint.

DETAILED DESCRIPTION OF EXEMPLARY EMBODIMENTS

Figure 1:
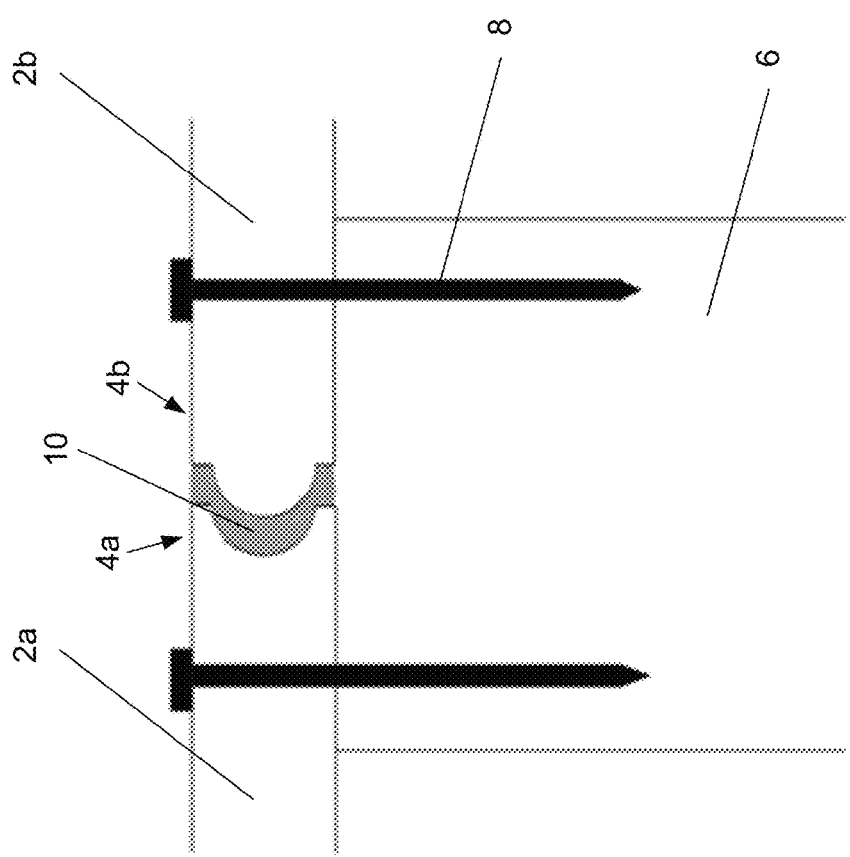
FIG. 1 shows a view of a system in accordance with an exemplary embodiment of the present invention.

Wall and roof sheathing and structural panels may consist of, but are not limited to, plywood, oriented-strand board (OSB), other forms of manufactured wood, paper board, foam, gypsum, and glass mat. Sheathing panels typically are produced in nominal sizes of 4'×8', 4'×9', 4'×10' or similar dimensions (panels may be undersized by approximately ⅛" to allow for proper spacing). Examples of manufacturing processes for siding and structural panels are disclosed in U.S. patent application Ser. No. 15/803,771, filed Nov. 7, 2017, which is incorporated herein in its entirety by specific reference for all purposes. Wall sheathing is typically installed on the outside of a building's exterior envelope and may or may not be structural in design.

Building codes typically require that a weather or water-resistive barrier (WRB) layer be applied to this sheathing layer prior to installation of exterior cladding. WRBs have traditionally been applied on the jobsite following the installation of the wall sheathing. The WRB membrane is typically sold in long rolls and fastened to the sheathing panels. The membrane will span multiple adjacent sheathing panels and is installed in a manner as to provide top over bottom (i.e., "shingling") and side overlaps to allow water to run from one layer to the next without entrapment. The WRB membrane, once installed, is often left vulnerable to wind and weather which may cause damage to the membrane. Field-installed WRB membranes also are difficult to properly air seal to meet building exterior air barrier requirements. Examples of WRB membranes are disclosed in U.S. patent application Ser. No. 15/365,731, filed Nov. 30, 2016, which is incorporated herein in its entirety by specific reference for all purposes.

To address some of the problems of field-applied membranes, a new generation of products have been developed which have the WRB membrane or layer factory applied to the wall sheathing. These integrated products are fastened to the wall framing in a similar manner to the sheathing products listed above. In order to complete the system as a WRB, all of the panel joints must be sealed. The most common sealing method used currently consists of seam that are applied so that the center of the tape width aligns with the center of the panel joint and therefore covers all nails used to fasten the sheathing along the panel edges. Other sealing systems include fluid-applied sealants that may or may not use a reinforcing mesh. These sealants function similar to tape as they are applied to the center of the panel joint and extend over the panel edges to cover the nails used to fasten the sheathing to the wall framing.

Proper installation of the tape and/or fluid-applied sealing systems is a critical step in the WRB assembly, and time and care must be taken to ensure a durable, long lasting, sealed joint. As panel joints are lengthy, it is often challenging for installers to ensure tape alignment, and multiple corrections made during installation may compromise the system. Proper adhesion of the tape or fluid-applied sealant to the sheathing is another critical performance element, and is often negatively impacted by dirt and moisture on the jobsite along with variable temperature and humidity. Many tapes used also require adequate pressure to bond the adhesives (pressure sensitive tapes), which can be challenging for installers that are often working above ground with limited mobility. All of these installation and product variances described necessitate the need for a more robust joint sealing mechanism.

In various exemplary embodiments, the present invention comprises an integrated self-sealing joint sealing system that is incorporated into the factory edges of a sheathing panel 2a, b prior to installation at a job site. The integrated self-sealing joint sealing system eliminates the need to secondarily apply tapes or similar fluid-applied sealants, as the joints will become sealed when mated and installed next to adjacent sheathing panels. The system of the present invention may be used with panels that do not have an integrated WRB membrane or layer, as well as with panels that do have an integrated WRB membrane or layer 20.

The invention works with a variety of joint types, including, but not limited to, shiplap joints, tongue-and-groove joints, bead-and-cove joints, and butt joints. In several embodiments, as shown in the figures, the joint comprises a bead-and-cove or cove-and-cove type joint or a cove-and-butt type joint, with corresponding joint profiles 4a, b machined on corresponding edges of adjacent panels 2a, b. This type of joint increases the surface area for sealants to form a watertight and airtight seam. As compared to a shiplap joint, the joint described herein reduces or eliminates the overlap areas of the joints, thereby enabling placement of fasteners 8 (e.g., a nail, screw, staple, or the like) within or through full thickness panel edges, and thus more securely into framing members 6 on which the panel is mounted. Placement of fasteners 8 within two half-thickness portions of the panels (such as with a shiplap or similar overlapping joint), rather than a single full-thickness panel edge, will reduce in-plane shear strength (e.g., shear wall racking).

Figure 2:
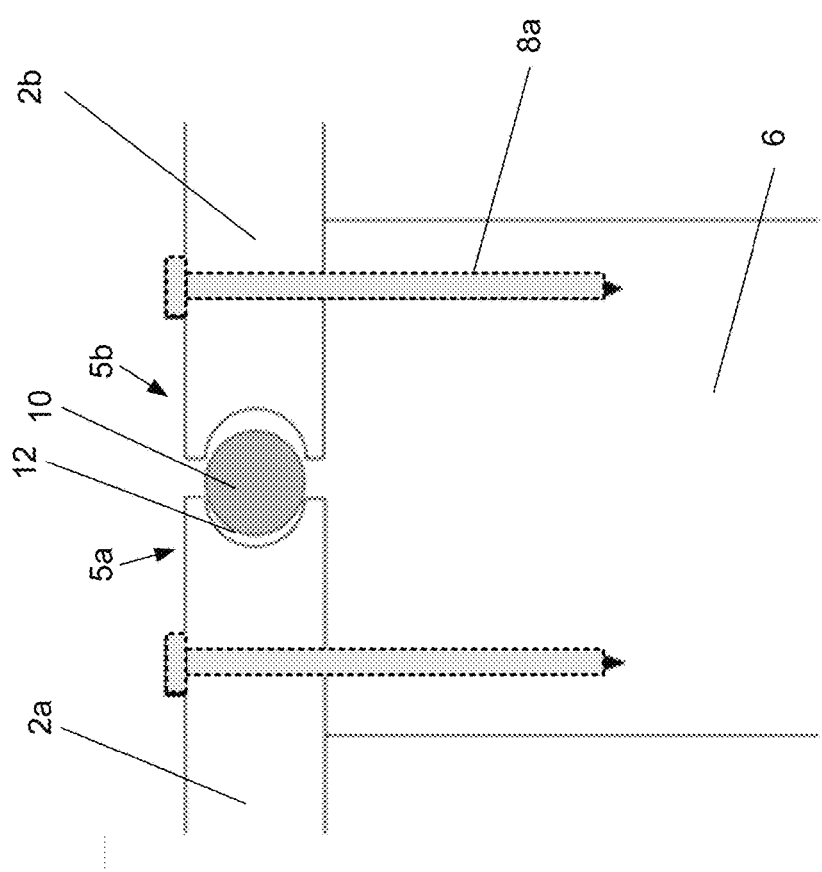
FIG. 2 shows another view of an alternative embodiment of the present invention.

In the embodiments shown in FIGS. 1 and 2, all four edges of a panel 2a, b have a corresponding joint profile 4a, b. For example, two adjacent edges of a panel will have a bead profile 4b, and the opposite edges 4a will have a cove profile, although other configurations are possible. A compressible sealant, adhesive or gasket material 10 is applied to surfaces in one or both profiles at the factory during the manufacturing process, or during a secondary or post-manufacturing process at the factory, prior to installation in the field. During field installation, the matching corresponding joint profiles 4a, 4b are placed together so the sealant material 10 is compressed, forming a complete joint.

FIG. 1 show an example of a bead-and-cove joint with sealant material 10 located between the corresponding joint profiles 4a, b, with the sealant material compressed after installation on the framing member 6. FIG. 2 shows an example of a cove-and-cove joint by corresponding cove joint profiles 5a, b being formed. Approximate location of the fasteners after installation is indicated by broken lines 8a.

The sealant 10 (which may be in the form of a backer rod or strip extending for all or substantially all of the length of the edge of the respective panel) is secured by adhesive or glue 12 into the cove (the circular or rounded spaced) on one panel edge profile, while a pressure sensitive adhesive is applied to the opposite bead or cove on the second panel edge profile. Alternatively, an adhesive with a peel-off release liner may be applied to the second panel edge profile. The sealant and/or adhesives may be applied at a factory during the manufacturing process or as a secondary or post-manufacturing process, and are delivered as such to the installation site. During installation, the pressure sensitive adhesive bonds to the backer rod on the adjacent panel, thereby forming a watertight and airtight seam.

In several embodiments, the back or bottom shoulder of the cove (for a cove-and-bead joint) or one or both coves (for a cove-and-cove joint) may extend further than the upper shoulder, thereby acting as spacer to ensure a gap is maintained between the panels on the outer face during installation. Alternatively, a spacer may be machined into the middle or one or both cove profiles.

Figure 3:
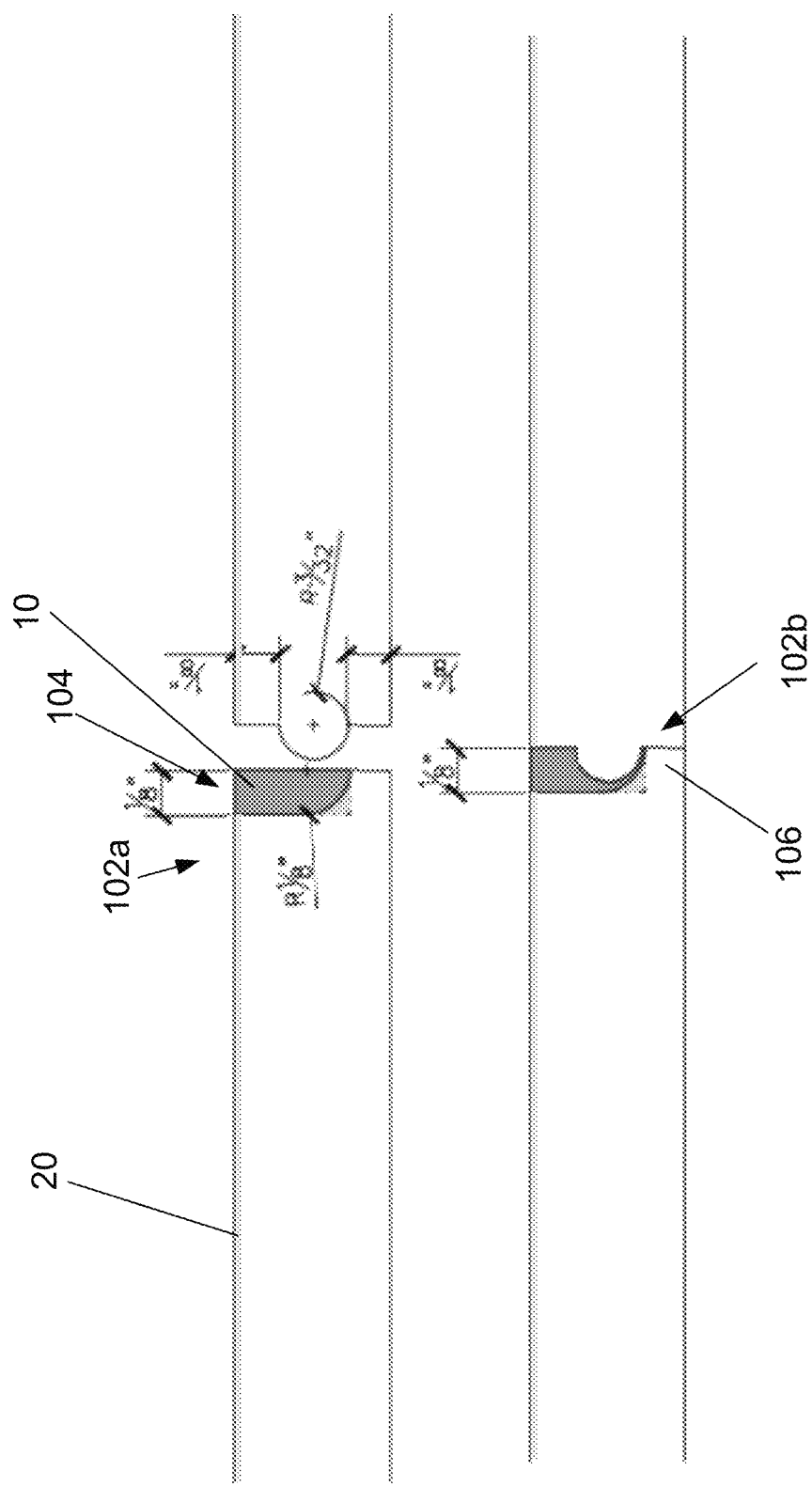
FIG. 3 shows another view of an alternative embodiment of the present invention.

FIG. 3 shows an example of a modified bead-and-cove joint. The upper shoulder of the cove profile 102a is open to the upper surface of the panel, while the bottom shoulder 106 extends outward. The sealant material 10 is adhered in the factory in the cove space, and in this embodiment does not extend beyond the bottom shoulder. During installation, the bead profile 102b of the adjacent panel presses into the adhesive material in the cove space, forming the watertight and airtight joint.

Figure 4:
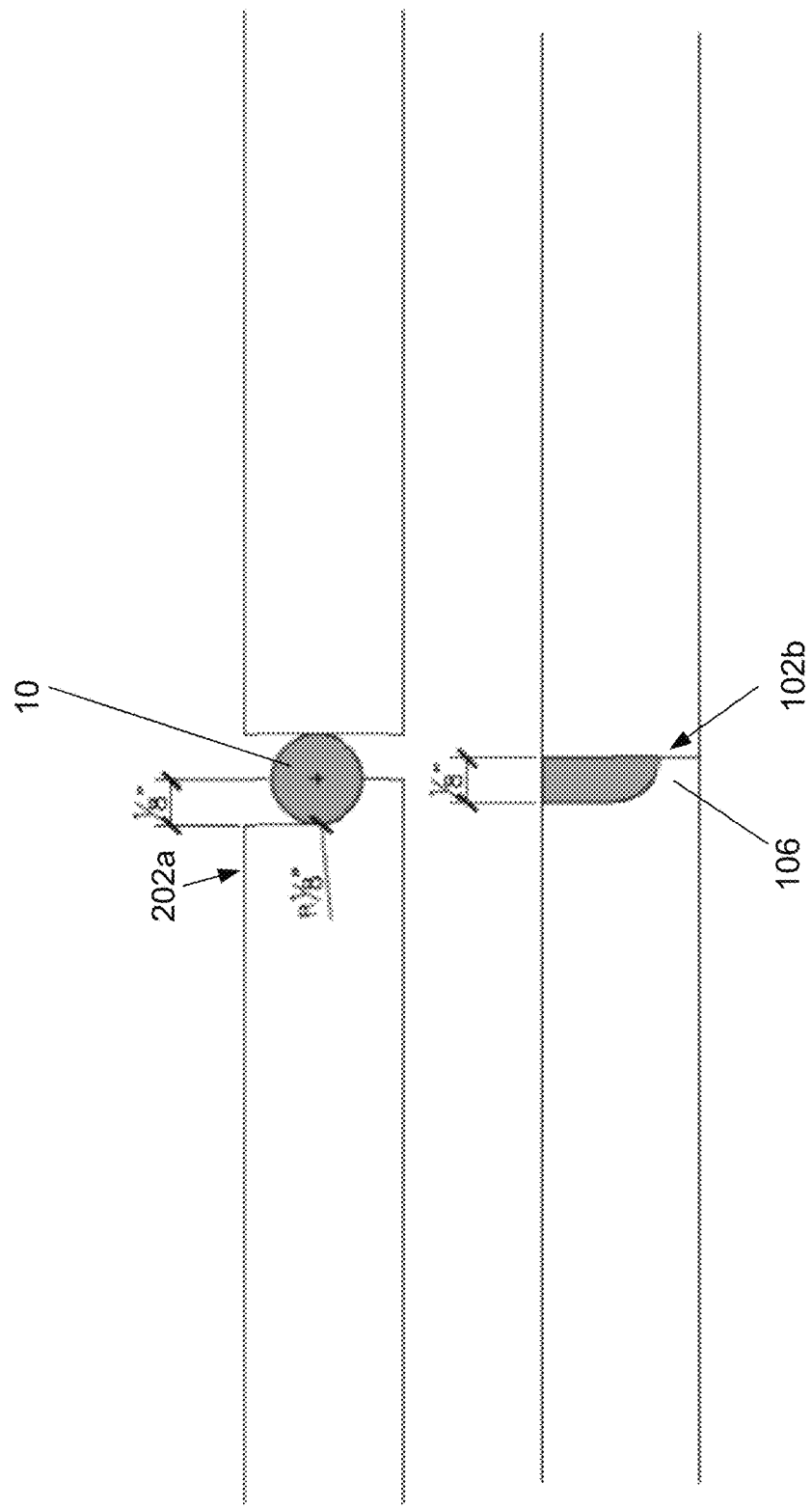
FIG. 4 shows another view of an alternative embodiment of the present invention.

FIG. 4 shows an example of a cove-and-butt (or flat) joint, where the cove profile 202a with sealant material 10 is as described above, except that the sealant is in tubular or rod form, forming a circle or rounded in cross section (and extending some or all of the length of the panel edge), so that a portion extends beyond the face of the bottom shoulder of the cove profile (i.e., some of the cove space is left unoccupied). The upper edge of the sealant material lies below the surface of the panel, which protects the sealant material from damage during storage and shipping of the panels. During installation, the butt/flat edge 202b of the adjacent panel presses into the sealant material 10, forcing it back and into the cove space, and above the surface of the panel and the upper surface of any WRB membrane or layer 20, forming the watertight and airtight joint.

Figure 5:
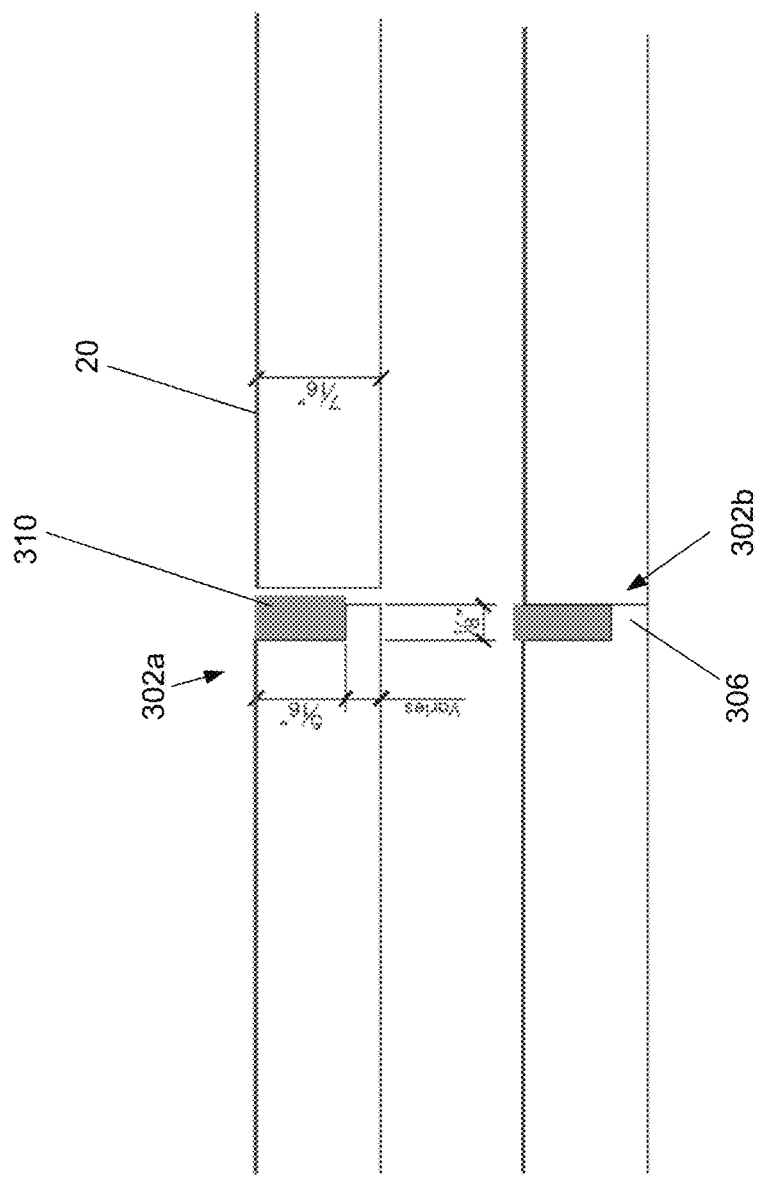
FIG. 5 shows a view of another alternative embodiment of the present invention with rectilinear sealant material.

FIG. 5 shows a rectangular form of a cove-and-butt joint, where the cove profile 302a is rectilinear with a bottom shoulder 306 with an upper surface extending substantially orthogonally to the vertical face of the edge (and thus substantially parallel to the upper surface of the panel), and contains a similarly rectilinear sealant material 310. The rectilinear sealant material is adhered to the panel edge along the long vertical face. It may also be adhered to the horizontal portion of the bottom shoulder 306 in some cases. The upper edge of the sealant material 310 may lay just below the surface of the panel, which protects the sealant material from damage during storage and shipping of the panels. The outer edge of the sealant material extends beyond the outer edge of the bottom shoulder of the panel edge face, so that compression caused when the butt/flat edge 302b of the adjacent panel presses into it, forces the sealant material back and up into the open cove space and above the surface of the panel and the upper surface of any WRB membrane or layer 20, forming the watertight and airtight joint.

The amount of sealant material depends on FIG. 5 shows an embodiment where both panels are 7/16" thick, with the bottom shoulder 1/8" in width. However, as there are variations in panel thickness due to the manufacturing process, the upper end of allowable thickness for a 7/16" OSB panel is typically 0.469" (i.e., 0.0315" thicker than the target thickness of 0.4375"). To ensure that the sealant material 310 extends above the upper or outward facing surface of the panels after assembly, the sealant material needs to extend at least 0.0126" wider than the width of the bottom shoulder. Preferably, it may extend even wider, thereby creating more pressure when installed to provide a tight seal when being compressed together.

The sealant material may comprise any compressible water-resistant or waterproof sealing material, including, but not limited to, one or more of the following materials: closed-cell polyethylene foam, a polyurethan foam, a hybrid bicellular polyethylene foam, or a butyl sealant.

The present invention provides a number of significant advantages and benefits over the prior art methods of secondary installation of seam tapes or fluid-applied sealants. The factory-installed sealant system and elimination of tape or fluid-applied sealant results in a significant reduction in both materials, labor, and associated jobsite waste. Horizontal joints with the prior art systems are of critical concern as failure in the taped joint or fluid-applied sealant may shuttle water into the joint and wall cavity behind. The gasket material applied continuously to the edges of the sheathing joints largely will be protected by the sheathing face after installation. Therefore, it will not be impacted negatively by UV degradation and impacts and abrasions common in construction that may damage tapes and fluid-applied sealants applied to the outside of the wall sheathing.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An integrated self-sealing joint system, comprising:
   a first panel with an upper surface, a lower surface, and a first edge with a first length;
   a second panel with an upper surface, a lower surface, and a second edge with a second length;
   wherein the first panel and second panel are arranged in adjoining position to form a joint along the first edge and second edge;
   wherein the first edge comprises a first joint profile and the second edge comprises a second joint profile;
   wherein the first joint profile comprises a step, with a top of the step open to the upper surface of the first panel, with a step surface between the upper surface and lower surface of the first panel extending to an outer face of the first edge;
   wherein the second joint profile comprises a flat butt edge with a flat outer face extending along the second edge for the entirety of the second length and from the upper surface to the lower surface of the second panel;
   wherein the first joint profile comprises a factory-installed seam sealant affixed to the first joint profile and extending vertically from the step surface to a level at or below the upper surface of the first panel and extending laterally beyond the outer face of the first edge;
   wherein the factory-installed seam sealant is configured to be compressed and seal the joint formed when the second joint profile is moved towards the first joint profile, further wherein when the joint is formed, the factory-installed seam sealant expands vertically upward beyond the upper surface of the first panel and is compressed laterally to extend no further than the outer face of the first edge.

2. The integrated self-sealing joint system of claim 1, wherein the second joint profile comprises a pressure-sensitive adhesive, wherein the pressure-sensitive adhesive is configured to adhere to the factory-installed seam sealant when the joint is formed.

3. The integrated self-sealing joint system of claim 2, further comprising a release-liner on the pressure-sensitive adhesive.

4. The integrated self-sealing joint system of claim 2, wherein the pressure sensitive-adhesive is factory-applied.

5. The integrated self-sealing joint system of claim 1, further comprising a weather resistant barrier overlaying an outer face of the first panel.

6. The integrated self-sealing joint system of claim 5, wherein the weather resistant barrier is integrated with the first panel.

7. The integrated self-sealing joint system of claim 1, wherein the factory-installed seam sealant is rectilinear in cross-section.

8. A building panel, comprising:
   a manufactured wood panel in rectilinear form with a first surface, a second surface, a length, a width, and a thickness, with four edges, a first edge, a second edge, a third edge, and a fourth edge;
   wherein the first and second edges are adjacent and meet at a corner, each having a first joint profile;
   wherein the third and fourth edges are adjacent and meet at another corner, each having a second joint profile;
   wherein the first joint profile and the second joint profile are configured to form matching elements of a joint;
   wherein the first joint profile comprises a step, with the top of the step open to the first surface of the manufactured wood panel, with a step surface between the first surface and second surface of the first panel extending to an outer face of the respective first and second edges;
   wherein the second joint profile comprises a flat butt edge with a flat outer face extending along the second edge for the entirety of the second length and from the upper surface to the lower surface of the second panel;
   wherein the first joint profile comprises a factory-installed seam sealant affixed to the first joint profile and extending vertically from the step surface to a level at or below the first surface of the manufactured wood panel and extending laterally beyond the outer face of the first edge; and
   wherein the second joint profile comprises a pressure-sensitive adhesive.

* * * * *